United States Patent [19]

Okawara

[11] 4,334,493
[45] Jun. 15, 1982

[54] ROTARY DRUM TYPE APPARATUS FOR APPLYING A COATING TO TABLETS

[75] Inventor: Mikio Okawara, Shizuoka, Japan

[73] Assignee: Ohkawara Mfg. Co., Ltd., Shizuoka, Japan

[21] Appl. No.: 231,908

[22] Filed: Feb. 5, 1981

[30] Foreign Application Priority Data

Feb. 6, 1980 [JP] Japan .................................. 55/13327

[51] Int. Cl.³ .............................................. A23G 3/20
[52] U.S. Cl. ..................................... 118/19; 118/303; 118/20
[58] Field of Search ....................... 118/19, 20, 24, 303

[56] References Cited

U.S. PATENT DOCUMENTS 3,357,398 12/1967 Gross .................................. 118/20
4,245,580 1/1981 Okawara ............................. 118/19

FOREIGN PATENT DOCUMENTS 2251270 6/1975 France ................................. 118/19

Primary Examiner—Sam Silverberg
Attorney, Agent, or Firm—Armstrong, Nikaido, Marmelstein & Kubovcik

[57] ABSTRACT

A rotary drum type apparatus for applying a coating to tablets including a rotary drum supported by a support frame for receiving a body of tablets to be coated by spraying with a solvent. The drum is inclined through about 10–20 degrees in such a manner that its front surface is turned upwardly, and an air inlet tube and an air outlet tube are connected to the support frame in positions slightly displaced toward the rear surface of the support frame from the center line of the support frame extending perpendicular to the center axis of the drum. The support frame cooperates with an outer periphery of the drum to define an air suction duct disposed on the front side of the support frame and an air exhaust duct disposed on the rear side of the support frame so that a smooth flow of hot blast through the drum can be obtained.

3 Claims, 5 Drawing Figures

ROTARY DRUM TYPE APPARATUS FOR APPLYING A COATING TO TABLETS

BACKGROUND OF THE INVENTION

This invention relates to a rotary drum type apparatus for applying a coating to tablets.

In apparatus for applying a coating to tablets, the tablets are placed in a rotary drum and agitated while a solution is sprayed onto the tablets to apply a coat of the solution to each tablet. At the same time, the solvent is allowed to dry to leave the coating of the solute on each tablet.

An apparatus for applying a coating to tablets of the prior art is shown schematically in FIGS. 1 and 2 which comprises a flat rotary drum 1 slightly bulging at the centers of the front and rear ends, a support frame 2, an air inlet tube 3 and an air outlet tube 4. The drum 1 which is the main body of the apparatus for applying a coating to tablets includes an outer periphery 8 formed of a porous air-permeable plate, and a door 5 attached to the front end for inserting the tablets into the drum 1 and withdrawing same therefrom.

A rotary shaft 7 extends outwardly through the rear end 6 and has a drive, not shown, connected thereto. The support frame 2 which performs the function of supporting the drum 1 for rotation cooperates with the outer periphery 8 to define therebetween a hot blast inlet duct 10 to supply a hot blast therethrough into the interior of the drum 1. When the drum 1 is angularly rotated about the air inlet tube 3 and air outlet tube 4 to withdraw the tablets from the drum 1, the support frame 2 can be made to face downwardly. More specifically, the air inlet tube 3 and air outlet tube 4 have the dual function of supporting the drum 1 or support frame 2 for angular rotation backwardly and forwardly and of supplying a hot blast to the duct 10, and are connected to the support frame 2 (drum 1) on a horizontal line extending through the center thereof. The numeral 9 designates spray nozzles for spraying the solution to the tablets.

In the apparatus for applying a coating to tablets of the prior art constructed as described hereinabove, the air inlet tube 3 and air outlet tube 4 are connected to the support frame 2 on a horizontal line extending through the center of the drum 1, and a tablet coating operation is carried out while the drum 1 is maintained in a vertical position. Some disadvantages are associated with the tablet coating apparatus of the prior art.

In the aspect of construction, the apparatus including the support frame and the drive becomes unbalanced and the rear side becomes overweighted because the drive including a motor and a speed change gearing is mounted on the rear end of the drum 1. This makes it necessary to cause the air inlet tube 3 and air outlet tube 4 to produce a force urging them to resist the tendency of the drum 1 to become unbalanced, to maintain the drum 1 in a vertical position at all times. Thus the construction that would enable the balancing of the drum 1 to be achieved as aforesaid would have to bear a heavy burden, with the result that the apparatus itself would have a short service life. In addition, when the support frame 2 is caused to face downwardly in withdrawing the tablets from the drum 1, a force of high magnitude is required. In the aspect of operation, the tablets T placed in the drum 1 strongly tend to move along an orbit which is parallel to the direction of rotation of the drum 1. Thus there is a considerable difference in speed between the mixing of the tablets T moving along the same orbit and mixing of the tablets T moving along different orbits. For example, the tablets Ta located near the center of the drum 1 mix one another at the early stages of rotation of the drum 1, but the tablets Tc located at the opposite ends of the drum 1 have difficulty in being mixed with one another. Thus irregularities and variations in drying and coating of the tablets T tend to occur. To avoid this phenomenon, it becomes necessary to prolong the time of operation so that spraying of the tablets with a solution can be performed slowly. In this system of operation, the number of spray nozzles for spraying the solution should be minimized because the layers of tablets in the drum that move along the orbits therein have a narrow width. This results in a reduction in operation efficiency.

SUMMARY OF THE INVENTION

This invention has as its object the provision of a rotary drum type apparatus for applying a colating to tablets which obviates the aforesaid disadvantages of the prior art.

In the apparatus according to the invention, the air inlet tube and the air outlet tube are connected to the support frame for the drum in positions which are displaced toward the rear surface of the drum from the center line of the support frame extending perpendicular to the center axis of the drum to enable the apparatus to become balanced as seen axially, to thereby eliminate unduly great burdens which the apparatus might otherwise have to bear. Also, the drum is inclined through about 10–20 degrees in such a manner that its front surface is turned upwardly to increase the efficiency with which a coating is applied to the tablets. An air exhaust duct formed by the cooperation of the support frame with an outer periphery of the drum is disposed on the rear side of the drum, to allow a current of hot blast to flow smoothly through the drum.

Additional and other objects, features and advantages of the invention will become apparent from the description set forth hereinafter when considered in conjunction with the accompanying drawings.

DESCRIPTION OF THE PREFERRED EMBODIMENT

Figure 1:
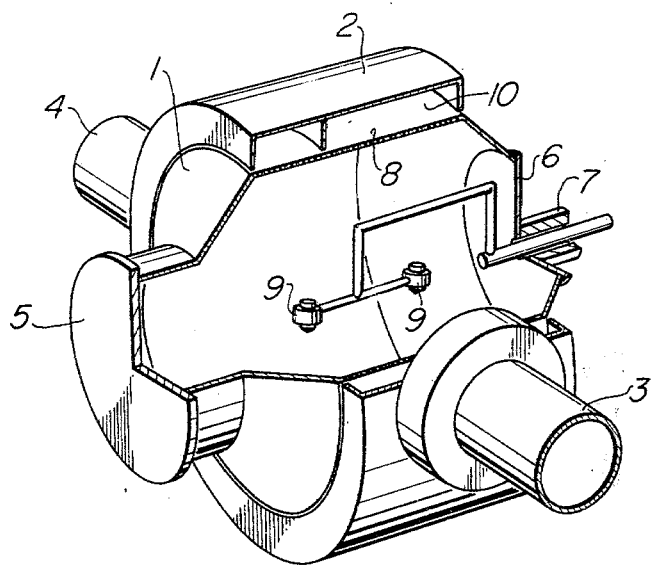
FIG. 1 is a perspective view, with certain parts being broken away, of a rotary type apparatus for applying a coating to tablets of the prior art.
Figure 2:
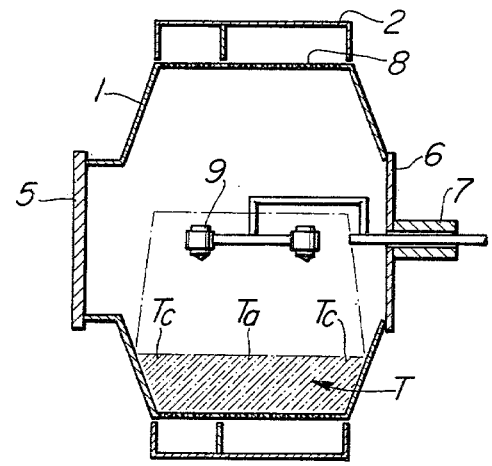
FIG. 2 is a vertical sectional side view of the apparatus shown in FIG. 1.
Figure 4:
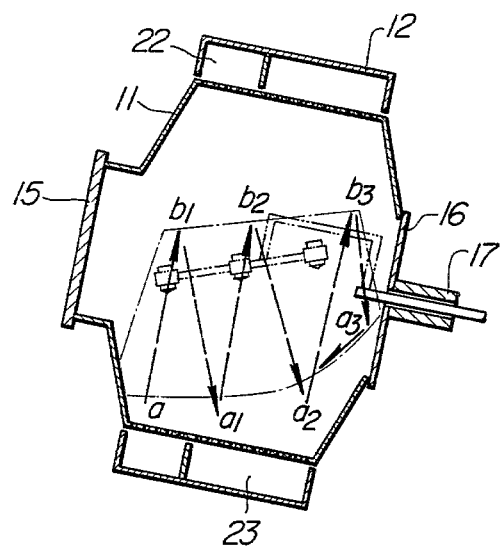
Figure 5:
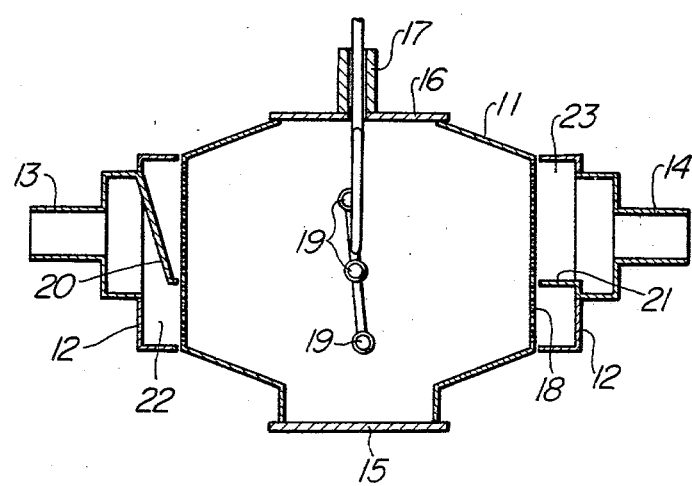
FIG. 5 is a transverse sectional view of the apparatus shown in FIGS. 3 and 4.

A preferred embodiment of the invention will now be described by referring to FIGS. 3–5. In the figures, the numerals 11, 12, 13, 14, 15, 16, 17, 18 and 19 designate a drum, a support frame, an air inlet tube, an air outlet tube, a door, a rear surface, a rotary shaft, an outer periphery and spray nozzles respectively. These parts are essentially similar to the corresponding parts of the apparatus of the prior art shown in FIGS. 1 and 2, so that their detailed description will be omitted.

However, the apparatus according to the invention is distinct in several structural relations of the parts from the apparatus of the prior art. As shown in FIG. 5, the air inlet tube 13 and air outlet tube 14 are displaced from the center of the drum 11, and more particularly they are displaced from the center line of the support frame 12 extending perpendicular to the center axis of the drum 11 toward the rear surface 14 of the drum 1 so that the apparatus becomes balanced when the apparatus including the support frame 12 and drum 11 has means including a drive for the drum 11 connected thereto. The drum 11 is inclined through about 15 degrees in such a manner that its front surface is turned upwardly.

The support frame 12 has its interior divided by a partition plate 20 to define, by cooperation with the outer periphery 18 of the drum 11, an air suction duct 22 communicating with the air inlet tube 13. The support frame 12 also has its interior divided by a partition plate 21 to define, by cooperation with the outer periphery 18 of the drum 11, an air exhaust duct 23 communicating with the air outlet tube 14. The partition plate 20 is slightly displaced from the center line of the support frame 12 toward the front surface of the drum 11, and the partition plate 21 is located substantially on the same circumference as the partition plate 20 so that the air exhaust duct 23 is disposed on the rear side of the support frame 12.

As described in detail hereinabove, the present invention provides novel structural relationships in which the air inlet tube 13 and air outlet tube 14 are displaced toward the rear surface 16 of the drum 11 from the center line of the support frame 12 extending perpendicular to the center axis of the drum 11, the drum 11 is inclined through about 10–20 degrees in such a manner that its front surface is turned upwardly, and the air exhaust duct 23 is disposed near the rear surface of the support frame 12.

The invention having the aforesaid features offers the following advantages:

(1) The arrangement that the air inlet tube 13 and air outlet tube 14 are displaced from the center line of the support frame 12 extending perpendicular to the center axis of the drum 11 toward the rear surface 16 of the drum 11 enables the apparatus to be balanced. That is, the weight of a half portion of the apparatus rearwardly of the positions in which the air inlet tube 13 and air outlet tube 14 are connected to the drum 11 becomes substantially equal to that of the other half portion thereof forwardly of such positions, so that smooth operation of the apparatus can be obtained without any trouble. In addition, the operation of turning the drum 11 to face downwardly can be readily performed when it is desired to withdraw the tablets from the drum 11.

(2) The arrangement that the drum 11 is inclined through about 10–20 degrees in such a manner that its front surface is turned upwardly is conducive to increased operation efficiency. More specifically, when a predetermined amount of tablets are placed in the drum 11 and the drum 11 is rotated to perform a coating operation, the tablet disposed at a point a in FIG. 4, for example, will move in the direction of rotation of the drum 11. After reaching a point b1, this tablet will tumble down to a point a1, and the tablet will be lifted again as the drum 11 rotates until it reaches a point b2 from which it will tumble down to a point a2. In this way, all the tablets will continuously move up and down during rotation of the drum 11 and shift toward the rear surface 16 of the drum 11 by repeatedly moving up and down until they reach a point a3 which is the uppermost position on the stack of tablets in the drum 11. From this uppermost position, the tablets will be returned to the starting point a. While moving in this way, all the tablets are thoroughly mixed. The stack of tablets in the drum 11 is not horizontal at its upper surface but is higher on the rear surface side of the drum 11 than on the front surface side thereof. Thus the agitated tablets move over a wider area in the apparatus according to the invention than in the apparatus of the prior art in which the drum is supported in an upright position without being inclined during operation. It has been ascertained that since the path of movement of the tablets forming a stack in the drum 11 covers a greater distance than in the drum of the upright type, it is possible to place 1.5 to 2.0 times as large an amount of tablets in the drum 11 as that placed in the drum of the upright type with the depth of the stack equal to that of the prior art. This is conducive to increased amount of tablets that can be handled in a single operation. Moreover, the air exhaust duct has a large effective area and the efficiency with the tablets are dried can be increased.

Figure 3:
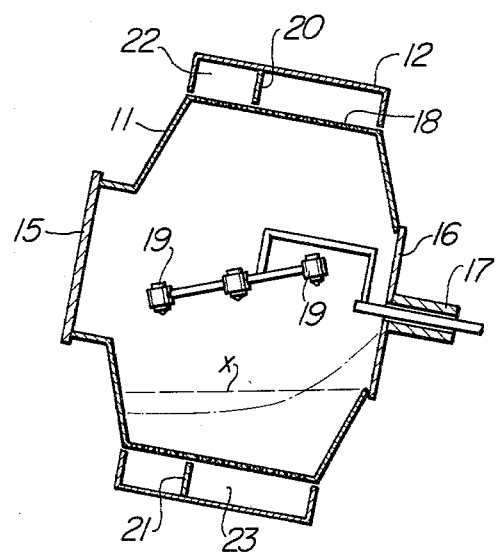
FIGS. 3 and 4 are vertical sectional side views of the rotary drum type apparatus for applying a coating to tablets comprising one embodiment of the present invention.

The surface of the stack of tablets in the drum 11 has an area larger than the surface area of a substantially horizontal surface indicated by a phantom line X in FIG. 3, and the up-and-down movements of the tablets cover substantially the same distance.

As described hereinabove, the tablets in the drum 11 can be readily mixed with one another, the tablets can be dried with a high degree of efficiency, and the tablets can be sprayed with a solution in various different phases as they move in a stack which has a large surface area and allows the tablets to move up and down in a manner to cover substantially the same distance. This permits an increased number of sprays nozzles 19 to be used to allow a solution to be sprayed in large amounts onto the tablets while the drum 11 is rotated, thereby further increasing operation efficiency.

(3) The arrangement that the air suction duct 22 is disposed near the front surface of the drum 11 and the air discharge duct 23 is disposed near the rear surface of the drum 11 is conducive to an increasingly smooth flow of hot blast within the drum 11, thereby further increasing operation efficiency. The air exhaust duct 23 is disposed near the position in which the air outlet tube 14 is connected to the duct 11, so that resistance offered to the air exhausts is minimized. Since the partition plates 20 and 21 are mounted substantially on the same circumference in the support frame 12, the outer periphery 18 of the drum 11 has an air suction area and an air discharge area separated from each other. Thus the risk that part of the solute adhering to the outer periphery 18 in the air exhaust area might be dislodged in the air suction area and incorporated in the tablets can be avoided, so that the quality of the product can be enhanced.

From the foregoing description, it will be appreciated that according to the present invention the air inlet tube and air outlet tube are displaced from the center line of the support frame extending perpendicular to the center axis of the drum toward the rear surface of the drum to enable the apparatus to become balanced, the drum is inclined through about 10–20 degrees in such a manner that the front surface of the drum is turned upwardly, and the air exhaust duct is provided on the rear surface side of the drum. These features enable the apparatus to be handled with ease and operation efficiency of the apparatus to be greatly increased.

What is claimed is:

1. A rotary drum type apparatus for applying a coating to tablets, comprising:
    a drum having the tablets placed therein to apply a coating thereto;
    a support frame for supporting said drum for rotation;
    an air inlet tube and an air outlet tube connected to said support frame; and
    a drive mounted on a rear surface of said drum; wherein the improvement resides in that said air inlet tube and said air outlet tube are disposed in positions slightly displaced from the center line of the support frame extending perpendicular to the center axis of the drum toward the rear surface of the drum whereby the apparatus including the drum, the support frame and the drive can be balanced.

2. An apparatus as set forth in claim 1, wherein said drum is inclined through about 10–20 degrees in such a manner that the front surface thereof is turned upwardly.

3. An apparatus as set forth in claim 1 or 2, wherein said support frame has its interior divided into an air suction duct formed on the front surface side of the support frame and an air exhaust duct formed on the rear surface side of the support frame.

* * * * *